United States Patent
Kennedy

[11] 3,965,924
[45] June 29, 1976

[54] BRAKE MEANS FOR A CENTER PIVOT IRRIGATION SYSTEM

[76] Inventor: James M. Kennedy, 240 E. 6th St., Ainsworth, Nebr. 69210

[22] Filed: May 6, 1975

[21] Appl. No.: 567,725

[52] U.S. Cl. .............................. 137/344; 188/82.7; 239/177
[51] Int. Cl.² ........................................... B05B 3/12
[58] Field of Search ............ 239/177, 212; 137/344; 180/7 R, 10; 74/142, 575; 188/82.2, 82.7

[56] References Cited
UNITED STATES PATENTS

| | | | |
|---|---|---|---|
| 3,386,661 | 6/1968 | Olson et al. | 239/212 X |
| 3,766,937 | 10/1973 | Lundvall et al. | 239/212 X |
| 3,866,836 | 2/1975 | Dowd | 239/177 |

*Primary Examiner*—Evon C. Blunk
*Assistant Examiner*—Michael Mar

[57] ABSTRACT

A brake for a center pivot irrigation system which prevents the drive towers of the system from undesirably moving in either a forwardly or rearwardly direction unless the brake means is released. The brake means comprises a spring loaded arm pivotally secured to the drive tower frame and having a lug receiving notch formed therein which is adapted to receive a lug provided on the drive wheel to prevent rotation of the drive wheel in either direction when the arm is in a first position. An actuating arm is also pivotally connected to the drive tower frame and is interconnected to the brake arm by a flexible cable extending therebetween and over a pulley. As the trojan bar on the drive tower moves through its drive stroke, the trojan bar engages the actuator arm to pivotally move the same so that the locking arm is moved upwardly out of engagement with the drive lug. If the drive wheel should rotate at a faster rate than that which the trojan bar is attempting to drive the same, the brake arm moves into engagement with one of the drive lugs to limit the forward movement of the drive tower. The locking arm also prevents the tower from being moved rearwardly during those times that the system is inoperative.

6 Claims, 6 Drawing Figures

BRAKE MEANS FOR A CENTER PIVOT IRRIGATION SYSTEM

BACKGROUND OF THE INVENTION

This invention relates to a brake means for a center pivot irrigation system and more particularly to a brake means which prevents rotation of the drive wheel of the drive tower in either a forwardly or rearwardly direction.

Center pivot irrigation systems normally comprise an overhead irrigation pipe which is rotated around a center pivot by a plurality of spaced apart support drive towers. In the air and water drive systems, a trojan bar is normally reciprocatably mounted on the drive tower frame and is adapted to engage spaced apart drive lugs provided on the drive wheels so that the wheels will be rotated a predetermined increment during each drive stroke of the trojan bar.

Brake systems have been provided on drive towers which engage the lugs of the drive wheels to prevent the drive wheels from rotating in a rearwardly manner during those times that the systems are inoperative. However, the conventional brake means do not provide any means for limiting the forward rotational movement of the wheels. This is especially troublesome if the drive tower is traversing uneven terrain which tends to cause the towers to move faster than the desired rate which causes misalignment of the towers. Additionally, high winds tend to move the towers in an undesirable fashion and the conventional systems do not have any means for preventing the towers from moving in a forwardly direction in advance of the wind.

Therefore, it is a principal object of the invention to provide an improved brake means for a center pivot irrigation system.

A further object of the invention is to provide a brake means for a center pivot irrigation system which prevents the rotation of the drive wheel on the drive tower in either direction until released.

A further object of the invention is to provide a brake means for a center pivot irrigation system which is easily installed on an existing structure.

A further object of the invention is to provide a brake means for a center pivot irrigation system which prevents undesirable movement of the support towers to prevent damage to the structure.

A still further object of the invention is to provide a brake means for a center pivot irrigation system which is economical of manufacture and durable in use.

These and other objects will be apparent to those skilled in the art.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

DESCRIPTION OF THE PREFERRED EMBODIMENT

Figure 4:
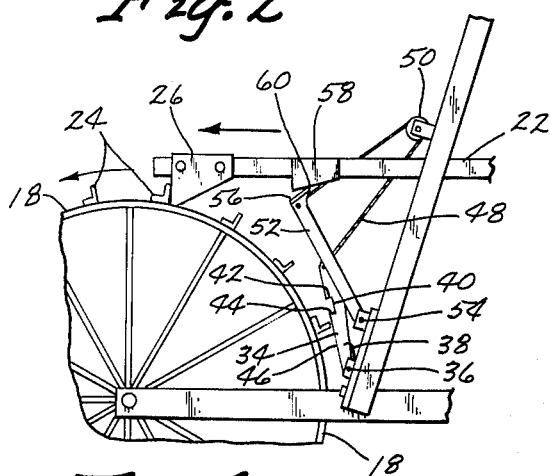
FIG. 4 is a view similar to FIG. 3 except that the brake means is illustrated in its released condition.
Figure 5:
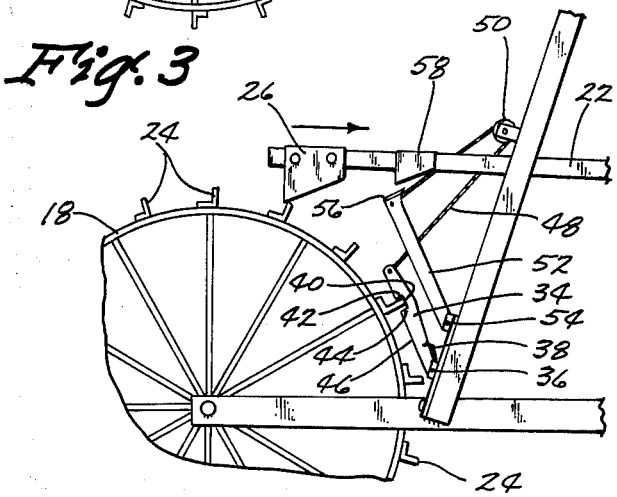
FIG. 5 is a view similar to FIGS. 3 and 4 and illustrates the brake means in its braking position.

The numeral 10 refers generally to a conventional center pivot irrigation system generally comprising an overhead irrigation pipe 12 supported along its length by a plurality of spaced apart drive towers 14. Each of the towers 14 generally comprises a frame means 16 having a pair of wheels 18 and 20 rotatably mounted thereon. Drive tower 14 also comprises a trojan bar 22 which is reciprocatably mounted thereon in conventional fashion. The numeral 25 refers to a conventional power means for moving the trojan bar 22 between its drive and return strokes. FIG. 4 illustrates the trojan bar 22 moving in its drive stroke while FIG. 5 illustrates the trojan bar 22 moving in its return stroke. Each of the wheels 18 and 20 are provided with drive lugs 24 provided on the periphery thereof in a spaced apart relationship. Ordinarily, the drive lugs have outer end portions which extend laterally outwardly of the wheel so that the dogs 26 and 28 provided on the opposite ends of the trojan bar 22 may engage the same to drive the wheels 18 and 20 forwardly during the drive stroke travel of the trojan bar. All of the structure described above is of conventional design adapted to cause the pipe 12 to be rotated about the center pivot 30.

Figure 6:
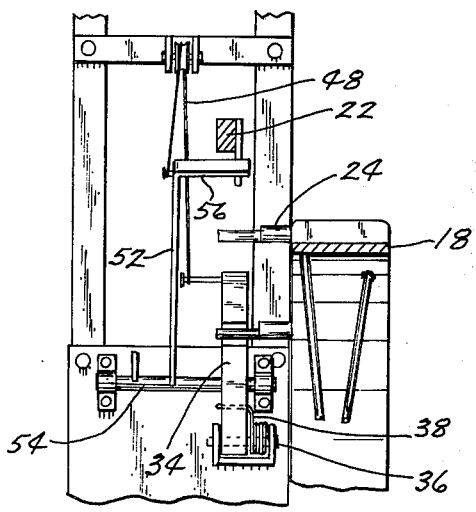
FIG. 6 is a sectional view seen on lines 6 — 6 of FIG. 3.

The brake means of this invention is referred to generally by the reference numeral 32 as illustrated in FIGS. 4 – 6. Brake arm 34 is pivotally connected at its lower end to the drive tower frame at 36 and has a spring 38 operatively connected thereto to yieldably urge the arm 34 towards the wheel 18. Arm 34 is provided with a lug receiving notch 40 formed in the lower edge thereof and defined by shoulders 42 and 44. For purposes of description, arm 34 will also be described as having a lower edge portion 46 which is located between the notch 40 and 36. Notch 40 is adapted to receive the lug 24 when in the position of FIG. 3 so that the wheel 18 is prevented from rotating in either a forwardly (counter-clockwise) direction or a rearwardly (clockwise) direction.

Cable 48 is connected to the upper end of arm 34 and extends upwardly therefrom and passes around a pulley 50 secured to the frame 16 as illustrated in FIG. 4. The other end of cable 48 is secured to the upper end of an actuator arm 52 which is pivotally connected to the frame 16 at 54. As seen in FIG. 6, arm 52 is provided with a laterally extending portion 56 which is adapted to engage the dog 58 secured to the trojan bar 22 inwardly of the dog 26. Dog 58 is provided with an inclined lower edge portion referred to generally by the reference numeral 60 and a forward edge portion referred to generally by the reference numeral 62.

Figure 1:
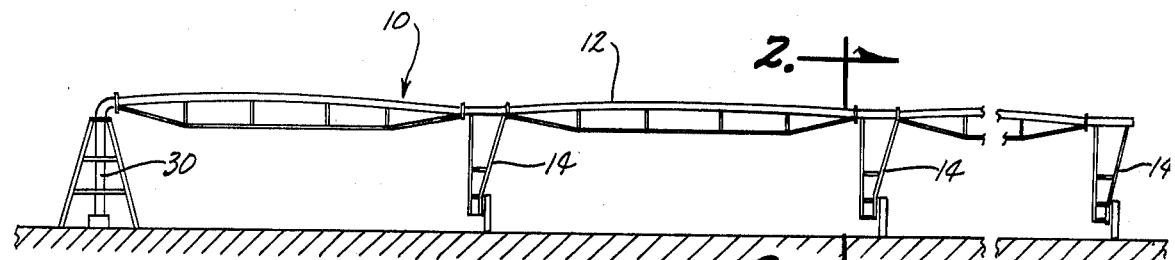
FIG. 1 is a partial side view of the center pivot irrigation system.
Figure 2:
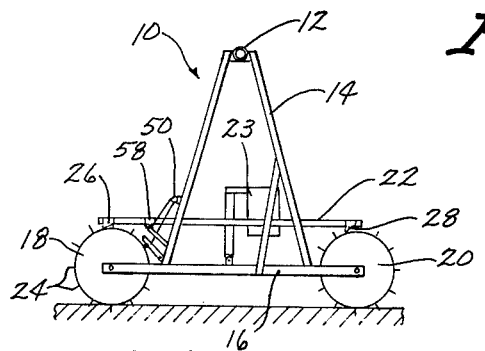
FIG. 2 is a sectional view seen on lines 2 — 2 of FIG. 1 which illustrates the relationship of the brake means of this invention to the drive wheel.
Figure 3:
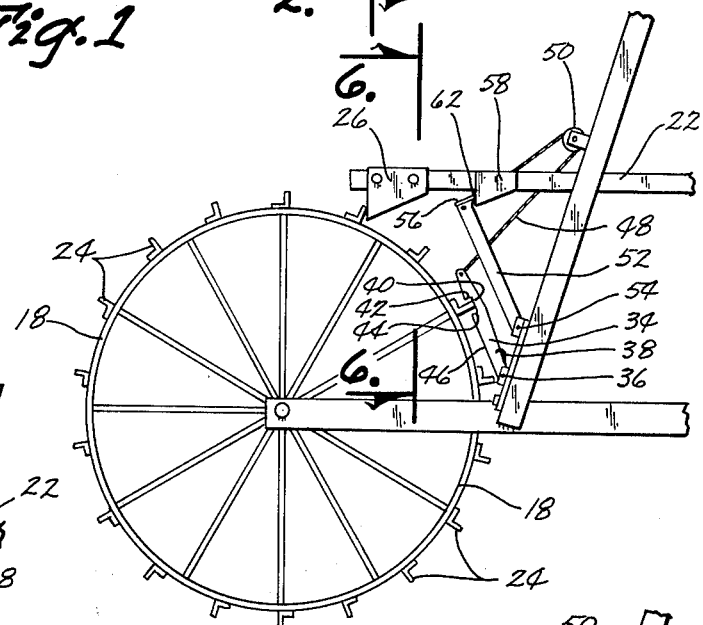
FIG. 3 is a partial side view of a drive tower having the brake means of this invention mounted thereon.

FIG. 3 illustrates the trojan bar 22 at the very beginning of its drive stroke. As seen in FIG. 3, the dog 26 is position rearwardly of a lug 24 with the notch 40 receiving one of the lugs 24. If the system is not being operated at this time, the arm 34 positively prevents rotation of the wheel 18 in either a rearwardly or forwardly direction due to the fact that one of the lugs 24 is received by the notch 40 and will be engaged by either of the shoulders 42 or 44 to prevent rotation of the wheel. If the system is in operation, the trojan bar 22 is moved to the left from the position of FIG. 3 to the position of FIG. 4 by the power means on the drive tower. Movement of the trojan bar 22 in its drive stroke causes the dog 58 to pivotally move arm 60 from the position of FIG. 3 to the position of FIG. 4. The engagement of the laterally extending portion 56 of arm 52 with the front edge portion 62 of dog 58 as the trojan bar 22 moves to the left causes the cable 48 to pivotally move the arm 34 upwardly relative to the dog 24 so that the wheel 18 is free to rotate.

As the trojan bar 22 continues with its drive stroke, the laterally extending portion 56 moves into engagement with the inclined lower edge portion 60 of dog 58 which permits the arm 60 to pivot about 54 in a clockwise manner as viewed in FIG. 4 so that slack will be present in the cable 48. With slack present in cable 48, the arm 34 is free to pivotally move towards the wheel 18 but is prevented from doing so since the next advancing lug 24 is in engagement with the edge portion 46 as illustrated in FIG. 4. As soon as wheel 18 has been sufficiently rotated by the trojan bar 22, the lug 24 will be received by the notch 40 which permits the arm 34 to pivot towards the wheel thereby preventing further rotational movement of the wheel as the trojan bar 22 begins its return stroke. If the tower 14 should be traveling down an incline during the drive movement of the trojan bar 22, the wheel 18 will tend to rotate at a rate faster than which the trojan bar 22 is attempting to drive it which will cause the arm 34 to pivotally move towards the wheel 18 so that the lug 24 will be received by the notch 40 to prevent further movement of the drive wheel. In other words, the wheel 18 is only permitted a certain amount of movement in a forwardly direction for each drive stroke of the bar 22 regardless of whether the trojan bar 22 has caused that movement or whether the wind or terrain has caused the forward movement of the tower.

As the trojan bar 22 is moving through its return portion of its stroke as illustrated in FIG. 5, the dog 26 rides upwardly rearwardly over the lug 24 which causes the dog 58 to also be moved upwardly relative to the laterally extending portion 56 so that there is no engagement between the dog 58 and the laterally extending portion 56. When bar 22 has completely moved through its return stroke, the dog 26 drops downwardly behind the proper lug 24 which causes the dog 58 to again be positioned relative to the laterally extending portion 56 of arm 52 such as seen in FIG. 3.

Thus it can be seen that a novel brake means has been provided for a center pivot irrigation system which prevents undesirable rotation of the drive wheel on the drive tower. The brake means of this invention prevents rotation of the drive wheel in either direction until the trojan bar is moving through its drive stroke and only permits a certain amount of movement of the drive wheel. Thus it can be seen that the brake means of this invention accomplishes at least all of its stated objectives.

I claim:

1. In combination,
    a center pivot irrigation system comprising an overhead irrigation pipe supported by a plurality of spaced-apart drive towers,
    each of said drive towers comprising a frame means having a pair of spaced-apart wheels mounted thereon,
    a trojan bar reciprocatably mounted on said frame means adapted to be moved in a drive stroke direction and a return stroke direction, said trojan bar engaging at least one of said wheels during its drive stroke whereby said one wheel will be driven,
    power means connected to said trojan bar for reciprocating said trojan bar,
    said one wheel having a plurality of spaced-apart lugs provided on its periphery,
    a brake means movably mounted on at least some of said drive towers and being movable into engagement with said lugs for selectively preventing rotation of said one wheel in either directions of rotation,
    and a control means connected to said brake means to move said brake means into and out of engagement with said lugs,
    said trojan bar having a first dog means provided on one end thereof for engagement with one of said lugs during its drive stroke to cause the said one wheel to be driven in a forward direction,
    a second downwardly extending dog means on said trojan bar spaced longitudinally inwardly of said first dog means,
    an elongated brake arm pivotally secured at one end to said frame means and extending upwardly therefrom,
    said brake arm having a lug receiving notch formed therein adapted to receive one of said lugs at times to prevent rotational movement of said one wheel in either direction when so engaged,
    an elongated actuator arm pivotally secured at one end to said frame means,
    a cable means interconnecting said actuator arm and said brake arm,
    the other end of said actuator arm being in the movable path of said second dog means whereby said second dog means will engage and cause said actuator arm to be pivotally moved as said trojan bar is moving during its drive stroke to cause said brake arm to pivotally move out of engagement with said lug.

2. The combination of claim 1 wherein a spring means normally urges said brake arm towards said one wheel.

3. The combination of claim 1 wherein said second dog means comprises a member extending downwardly from said trojan bar and having a front edge portion and an inclined lower edge portion extending upwardly from the lower end thereof.

4. The combination of claim 3 wherein the upper end portion of said actuator arm is positioned forwardly of said front edge portion before said trojan bar initially moves from its return stroke position to its drive stroke position.

5. The combination of claim 1 wherein said brake means includes means for moving said brake arm into engagement with one of said lugs as said trojan bar is in its return stroke position.

6. The combination of claim 1 wherein said actuation arm has a horizontally disposed upper end portion which extends laterally therefrom.

* * * * *